United States Patent
Sakamoto et al.

(10) Patent No.: US 6,257,290 B1
(45) Date of Patent: Jul. 10, 2001

(54) LOW-ASPECT TIRE

(75) Inventors: Masayuki Sakamoto; Atsushi Yamakage; Kazuya Suzuki, all of Shirakawa (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 0 days.

(21) Appl. No.: 09/318,773

(22) Filed: May 26, 1999

(30) Foreign Application Priority Data

Jun. 1, 1998 (JP) .................................................. 10-151437
Dec. 28, 1998 (JP) .................................................. 10-374835

(51) Int. Cl.[7] .................................................. B60C 13/02
(52) U.S. Cl. .................... 152/209.16; 152/523; 152/525; 152/543; 152/554
(58) Field of Search ..................................... 152/523, 524, 152/525, DIG. 12, 532, 543, 454, 209.16, 546, 555, 554; 156/133, 123

(56) References Cited

U.S. PATENT DOCUMENTS 2,874,746 * 2/1959 Nichols ................................. 152/524
3,982,579 * 9/1976 Mirtain ............................. 152/209.16
5,746,860 * 5/1998 Moriyama ............................. 156/111

FOREIGN PATENT DOCUMENTS 1-111502 * 4/1989 (JP) ...................................... 152/523

* cited by examiner

Primary Examiner—Geoffrey L. Knable

(57) ABSTRACT

A pneumatic tire having an aspect ratio of not more than 55% and comprising: an axially protruding rib provided on each side of the tire to overhang a flange of a wheel rim; a carcass extending between bead portions through a tread portion and sidewall portions; a belt disposed radially outside the carcass; a tread rubber disposed radially outside the belt to define the ground contacting surface of the tire; a sidewall rubber disposed on each side of the tire and extending from the tread portion to the rib along the axially outside of the carcass; a clinch rubber disposed on each side of the tire and extending from the bead portion to the rib along the outer surface of the tire; and a wing rubber disposed axially outside the sidewall rubber and extending from the tread rubber to the rib along the outer surface of the tire, the wing rubber being softer than the tread rubber. In a tire meridian section, in a region defined between 45% and 70% of the tire section height, every boundary line between rubber layers which include the tread rubber, sidewall rubber, clinch rubber and wing rubber at least, intersects neither the outer surface of the tire nor the outside of the carcass.

11 Claims, 8 Drawing Sheets

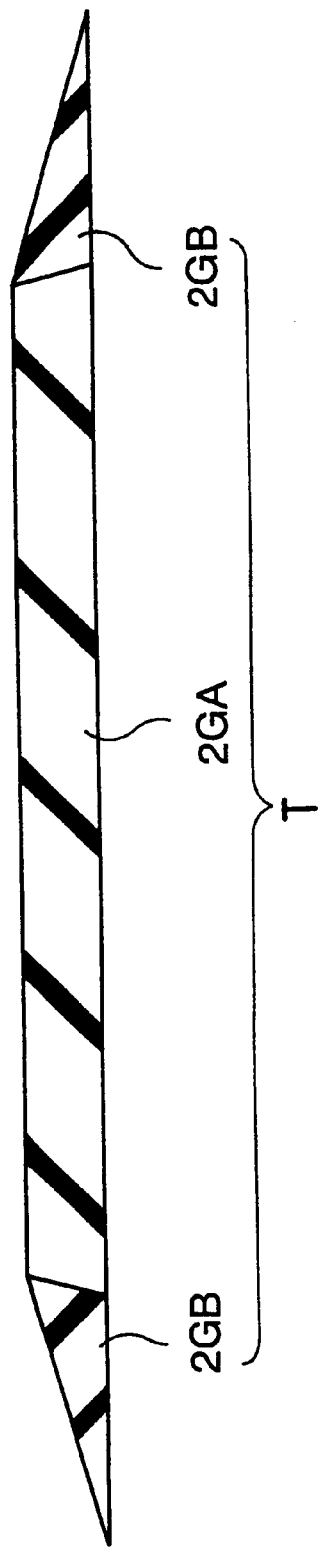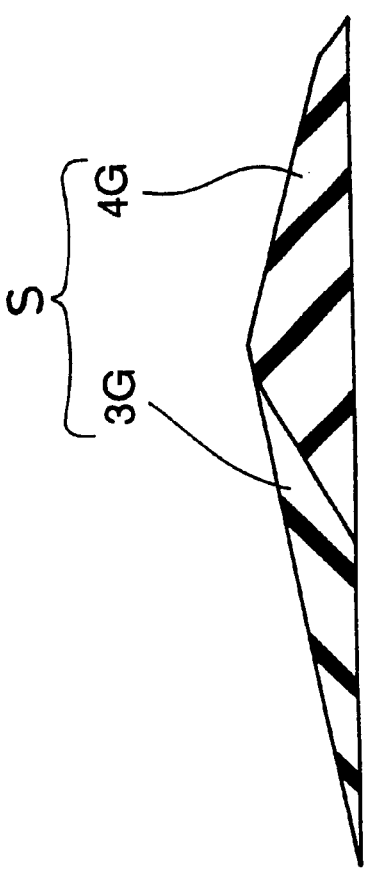

LOW-ASPECT TIRE

The present invention relates to a pneumatic tire, more particularly to a low-aspect tire improved in durability.

In radial tires having a low aspect ratio of under 55% especially under 40%, edges of reinforcing cord layers such as carcass, belt and the like and edges of rubber layers such as tread rubber, sidewall rubber, bead apex rubber, clinch rubber and the like inevitably concentrate in a narrow region, and cracks and separation failure and the like are liable to occur between such layers. Thus, it is difficult to improve the durability of tire.

On the other hand, as shown in FIG. 12, such low aspect radial tires are often provided with a part (c) which overhangs a rim flange (JF) of a wheel rim (J) in order to decrease vertical tire deflections. FIG. 12 shows a conventional structure in which: the above-mentioned overhanging part (c) is formed by a relatively hard clinch rubber (d) which is disposed along the axially outside of the bead portion (b) to a position (e) above the rim flange (JF); a sidewall rubber (i) is disposed along the outer surface of the tire to extends from the position (e) to an axial edge of a belt (f); a tread rubber (g) is disposed radially outside the belt (f); and a wing rubber (h) is disposed over the sidewall rubber (i) in the tire shoulder.

In a low-aspect radial tire having such overhanging part, bending deformation during running concentrates in an upper sidewall region (y). Therefore, in the conventional structure in which the boundary (k) between the tread rubber (g), wing rubber (h) and sidewall rubber (i) is located in such a region (y), separation failures are especially liable to occur along the boundary (k). Thus, the durability is greatly decreased.

It is therefore, an object of the present invention to provide a low-aspect tire in which the tire durability is improved by effectively preventing damage such as separations, cracks and the like occurred from boundaries between different rubber layers and edges of various layers.

According to one aspect of the present invention, a pneumatic tire having an aspect ratio of not more than 55% comprises an axially protruding rib provided on each side of the tire to overhang a flange of a wheel rim,
a carcass extending between bead portions through a tread portion and sidewall portions,
a belt disposed radially outside the carcass,
a tread rubber disposed radially outside the belt to define the ground contacting surface of the tire,
a sidewall rubber disposed on each side of the tire and extending from the tread portion to the rib along the axially outside of the carcass,
a clinch rubber disposed on each side of the tire and extending from the bead portion to the rib along the outer surface of the tire, and
a wing rubber disposed axially outside the sidewall rubber and extending from the tread rubber to the rib along the outer surface of the tire, the wing rubber being softer than the tread rubber.

Therefore, due to the rib, the rib and part adjacent thereto are increased in the rigidity and the deformation thereof during running becomes decreased. The radially inner ends of the sidewall rubber and wing rubber and the radially outer end of the clinch rubber are positioned near or in the rib. Thus, the stress on the rubber ends can be minimized and separation failures and the like are effectively prevented.

Embodiments of the present invention will now be described in detail in conjunction with the accompanying drawings.

FIG. 10 is a schematic cross sectional view of a strip of integrated tread rubber and wing rubber.

FIG. 11 is a schematic cross sectional view of a strip of integrated sidewall rubber and clinch rubber.

Figure 1:
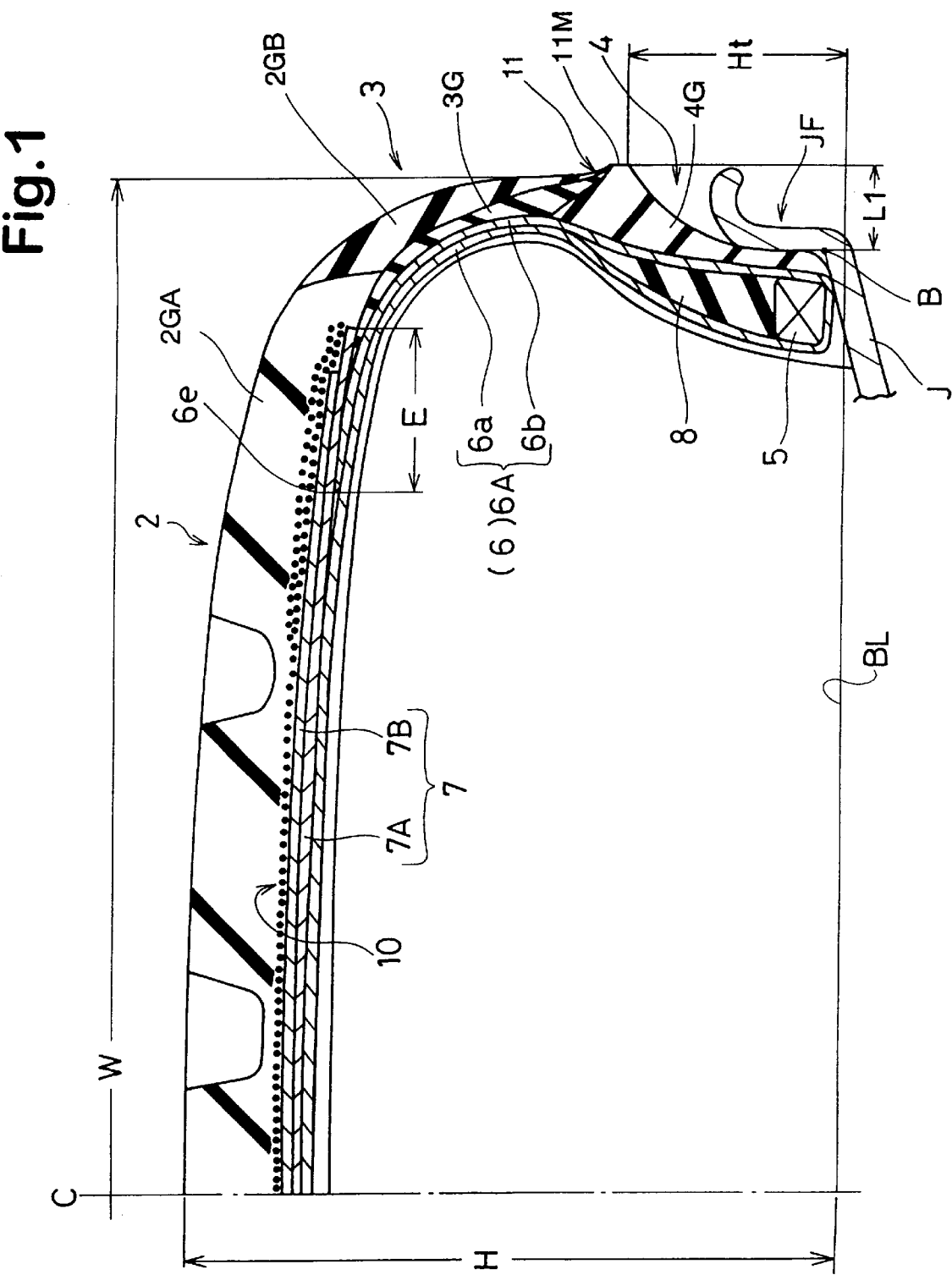
FIG. 1 is a cross sectional view of an embodiment of the present invention.

In the drawings, radial tire 1 according to the present invention comprises a tread portion 2, a pair of axially spaced bead portions 4 with a bead core 5 therein, a pair of sidewall portions 3 extending therebetween, a carcass 6 extending between the bead portions 4, and a belt disposed radially outside the carcass 6 in the tread portion 2.

The tire 1 has a relatively low aspect ratio of not more than 55%. In the embodiments shown in FIG. 1 and FIG. 4, the aspect ratio is not more than 40% and the tire section height (H) is not more than 100 mm.

The carcass 6 comprises a ply 6A of cords arranged radially at an angle of from 75 to 90 degrees with respect to the tire equator C, and extending between the bead portions 4 through the sidewall portions 3 and the tread portion 2, and being turned up around the bead cores 5 from the axially inside to outside of the tire to form two turnup portion 6b and a main portion 6a therebetween. For the carcass cords, organic fiber cords, e.g. polyester, nylon, rayon, aromatic polyamide or the like are used.

Figure 4:
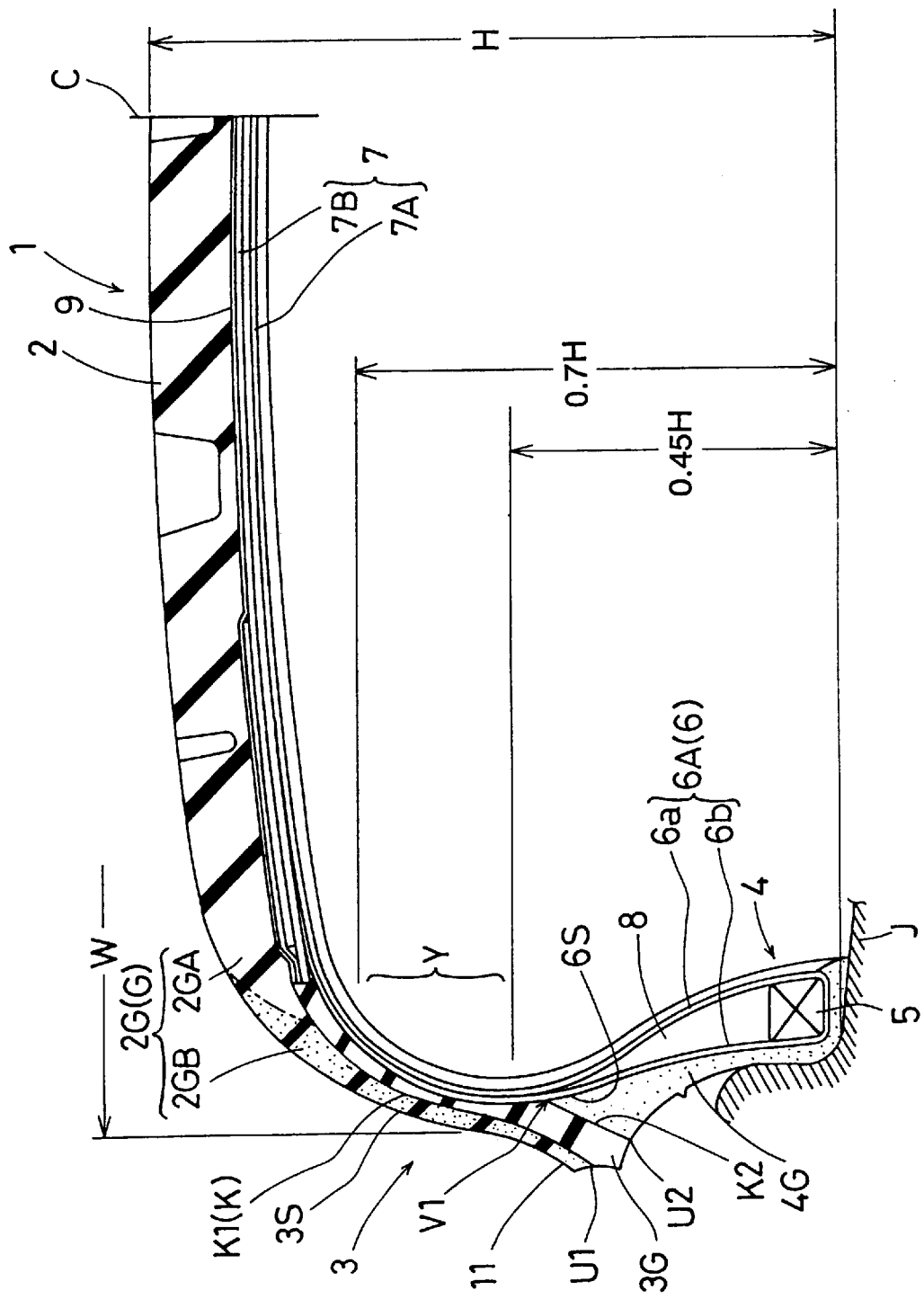
FIG. 4 is a cross sectional view of another embodiment of the present invention.

In the embodiments shown in FIGS. 1 and 4, the carcass 6 is composed of a single ply 6A of polyester cords arranged at substantially 90 degrees. The radially outer edges 6e of the turnup portions 6b are disposed between the belt 7 and carcass 6 to prevent ply edge loose and thereby to improve the durability. The overlap E of each turnup portion 6b with the belt 7 is preferably not less than 5 mm, more preferably 10 to 20 mm.

Between the main portion 6a and turnup portion 6b in each of the bead portions 4, a bead apex 8 made of a hard rubber compound is disposed. The bead apex 8 extends and tapers radially outwards from the bead core 5.

The belt comprises a breaker 7 and optionally a band 10 which is disposed on the radially outside of the breaker 7 to prevent the breaker 7 from being lifted during high speed running.

The breaker 7 comprises at least two cross breaker plies 7A and 7B of parallel cords laid at an angle of from 10 to 45 degrees with respect to the tire equator. For the breaker cords, steel cords and high elastic modulus organic fiber cords, e.g. aromatic polyamide, aromatic polyester, polyvinyl alcohol, rayon and the like can be used.

The band 10 is made at least one cord of which cord angle with respect to the circumferential direction is not more than 5 degrees or substantially zero. For the band cord, nylon cords are preferably used.

In the embodiments shown in FIGS. 1 and 4, the breaker 7 is composed of two breaker plies 7A and 7B each made of steel cords, and the band 10 is composed of a full-width ply extending across the full width of the tread and a pair of edge plies each extending in a breaker edge portion.

The tire 1 comprises various rubber layers G disposed outside a reinforcing cord structure comprising the above-mentioned carcass 6, belt 7 and band 10 at least. By arranging the thickness of such rubber layers G, a rib 11 is formed on each side of the tire 1.

The rib 11 has a top surface 11M between a radially outer edge P1 and a radially inner edge P2, a radially outer surface 11U extending radially outwards from the radially outer edge P1, and a radially inner surface 11L extending radially inwards from the radially inner edge P2.

The radially inner surface 11L is defined by a concave arc having a radius R1, and the outer surface 11U is defined by a concave arc having a radius R2 which is more than the radius R1.

Preferably, the radial distance L between the radially outer edge P1 and inner edge P2 is in the range of from 4 to 10 mm.

The overhang L1 of the rib 11 is set in a range of not less than 10%, preferably 10 to 20%, more preferably 10 to 15% of the tire section height H. The overhang L1 is defined as an axial distance between the radially inner edge P2 and the bead heel point B. If the overhang L1 is less than 10%, the bending rigidity of the bead portions 4 can not be effectively increased, and the steering stability and the like are deteriorated.

In the present invention, various sizes were measured under an unloaded standard condition in which the tire is mounted on a standard rim and inflated to a standard inner pressure but loaded with no tire load. The standard rim is the "standard rim" specified in JATMA, the "Measuring Rim" in ETRTO, the "design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. However, in case the tire is for passenger cars, the standard pressure is 180 KPa. The radial heights or heights referred in this specification are measured radially from the bead base line BL. The bead base line BL is an axial line passing a radial height corresponding to the rim diameter of the wheel rim. The bead heel point B is an intersecting point between the bottom line of the bead portion and the axially outer surface line of the bead portion.

Figure 6:
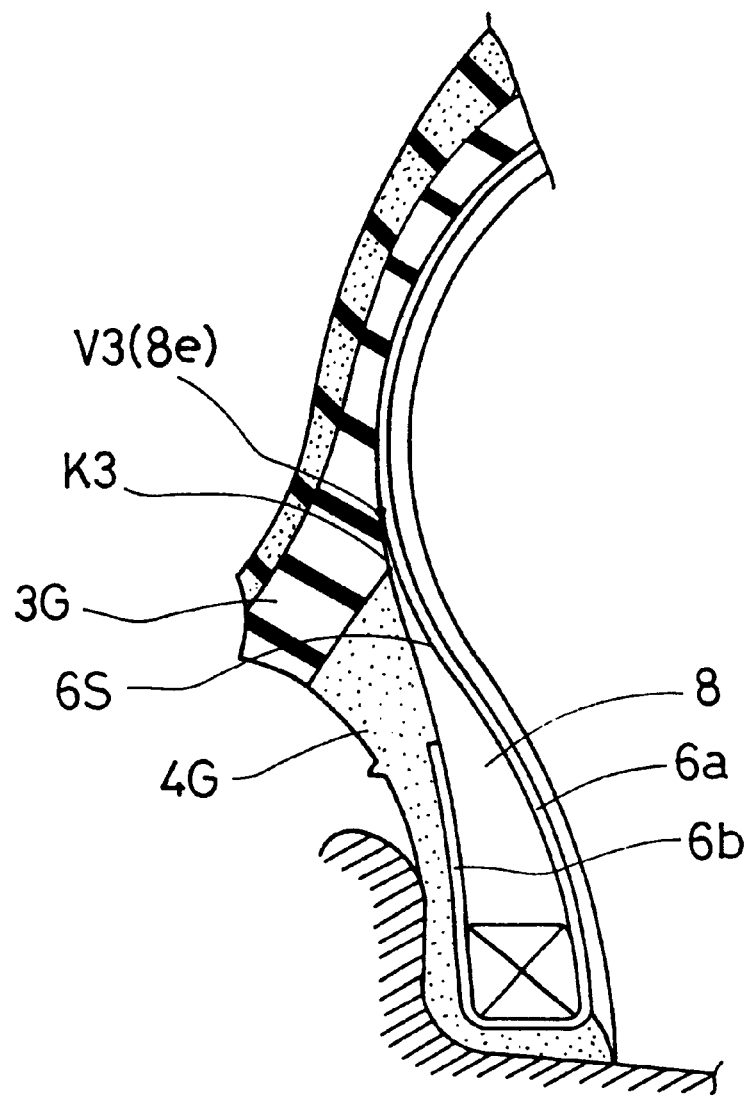
FIG. 6 is a cross sectional view showing another example of the carcass structure.

The above-mentioned rubber layers G include:
a tread rubber 2GA disposed radially outside the belt 7 to define the ground contacting face;
a sidewall rubber 3G disposed in each of the sidewall portions 3 along the axially outside of the carcass 6;
a wing rubber 2GB disposed on the axially outside of each sidewall rubber 3G and extending from one of the axial edges to the rib 11 to define the axially outer surface of the sidewall portion 3; and
a clinch rubber 4G disposed in each of the bead portions 4 and extending from the bead base to the above-mentioned rib 11 along the axially outside of the carcass 6 to define the axially outer surface of the bead portion. When the above-mentioned bead apex rubber 8 is completely wrapped in the carcass ply turnup portion, it is not included in the rubber layers G. But, when it is not wrapped completely as shown in FIG. 6, the bead apex rubber 8 is included. In the embodiments shown, the bead apex rubber 8 extends radially outwardly from the bead core 5 beyond the rib 11, but ends before the undermentioned region Y.

In a tire meridian section, a region Y (see FIG. 4) defined between 45% and 70% of the tire section height H is such a region that stress and strain are very high. Therefore, the rubber layers G are arranged such that, in this region Y, every boundary line K between the rubber layers G does not intersect neither the outer surface of the tire nor the outside of the carcass 6. Thereby, damages such as cracks, separations and the like starting from intersecting points can be effectively controlled and the durability is improved.

Such boundary lines K may include: a boundary line between the tread rubber 2GA and sidewall rubber 3G; a boundary line between the tread rubber 2GA and wing rubber 2GB; a boundary line K1 between the wing rubber 2GB and sidewall rubber 3G; a boundary line K2 between the clinch rubber 4G and sidewall rubber 3G; and a boundary line between the clinch rubber 4G and wing rubber 2GB.

For the clinch rubber 4G, a hard rubber compound having a strong resistance to abrasion is used. The sidewall rubber 3G is softer than the clinch rubber 4G and a rubber compound having flexibility and a good adhesive property to the wing rubber 2GB is used. For the tread rubber 2GA, a relatively hard rubber compound having a superior wear resistance is used. But the wing rubber 2GB is softer than the tread rubber 2GA and a rubber compound superior in adhesive property to the sidewall rubber 3G is used. As the rubbers 2GA, 2GB, 3G and 4G are different rubber compounds, generally they have different physical properties such as hardness and the like.

As the wing rubber 2GB is exposed to the outside of the tire, the rubber compound for the wing rubber preferably includes Ethylene-Propylen-Dien-Monomer (EPDM) for its excellent weather resistance, ozone crack resistance, light resistance and adhesive property. The iodine value of the EDPM is preferably set in a range of from 10 to 15 to improve the adhesive property. Further, in view of cut resistance, the rubber compound for the wing rubber 2GB preferably includes natural rubber and polybutadiene polymer. Furthermore, the acetone extraction of the wing rubber 15 is preferably set in a range of not more than 10%.

On the other hand, as the sidewall rubber 3G is not exposed to the outside of the tire, it is possible to use a relatively low grade rubber, for example: a high-oil rubber compound whose acetone extraction is more than 10% but not more than 20%; a rubber compound including at least 10 parts by weight of inorganic extender filler, e.g. calcium carbonate, magnesium carbonate and the like, with respect to 100 parts by weight of rubber component; a rubber compound including at least 30 parts by weight of styrene butadiene rubber; a rubber compound including GPF carbon as the reinforcing and bulking agent. Thus, the tire cost can be reduced.

The above-mentioned acetone extraction was measured according to Japanese Industrial Standard K6350-6.2 as follows. First, the rubber is chopped, and the weight W1 thereof is measured. The chopped rubber is soaked in acetone solvent eight hours. Then the weight W2 of the chopped rubber is again measured after dried thirty minutes at a temperature of 70 to 80 degrees C. The acetone extraction is obtained by the following equation:

$$(1-W2/W1) \times 100 \; (\%)$$

Figure 2:
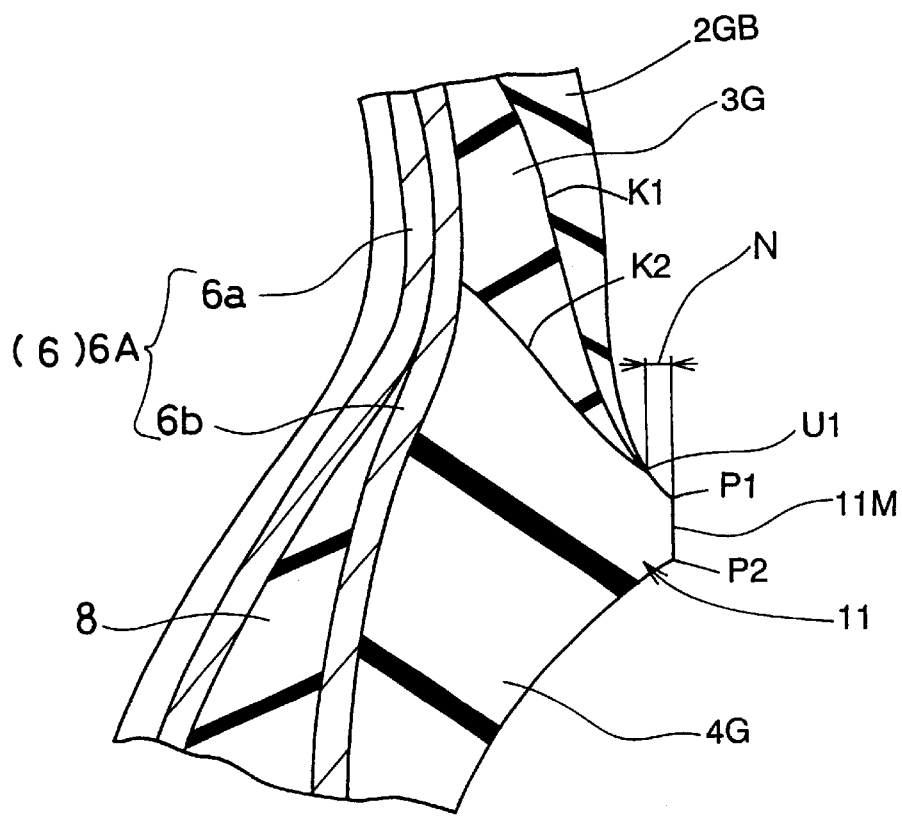
FIG. 2 is an enlarged cross sectional view showing an example of the rib.
Figure 3:
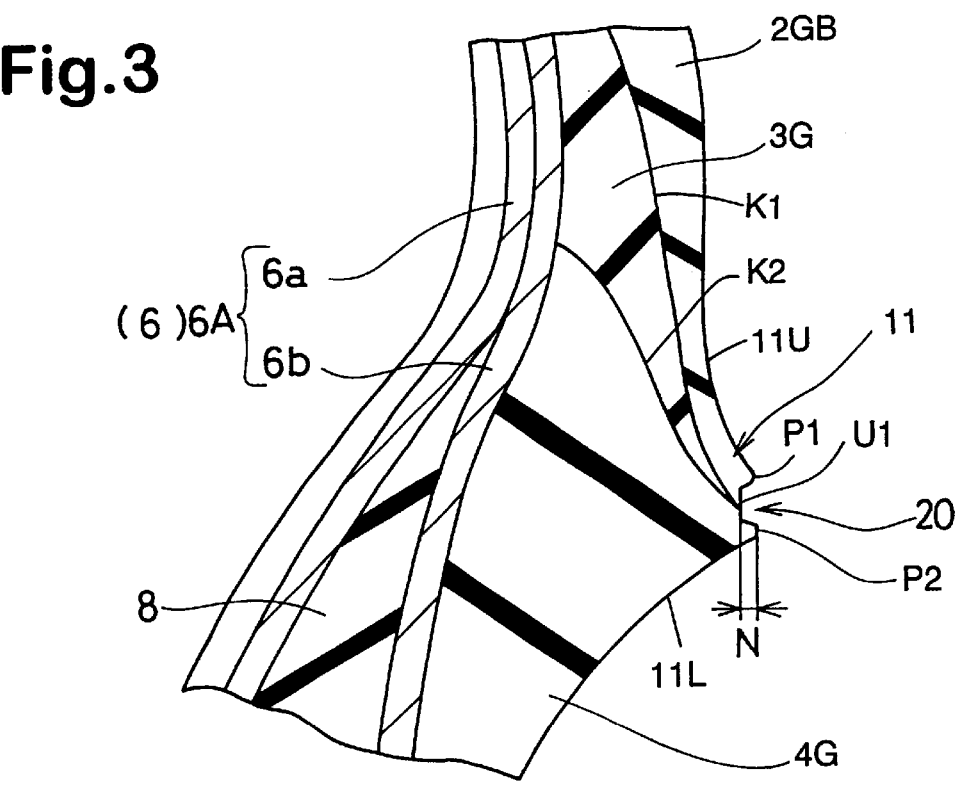
FIG. 3 is an enlarged cross sectional view showing another example of the rib.
Figure 5:
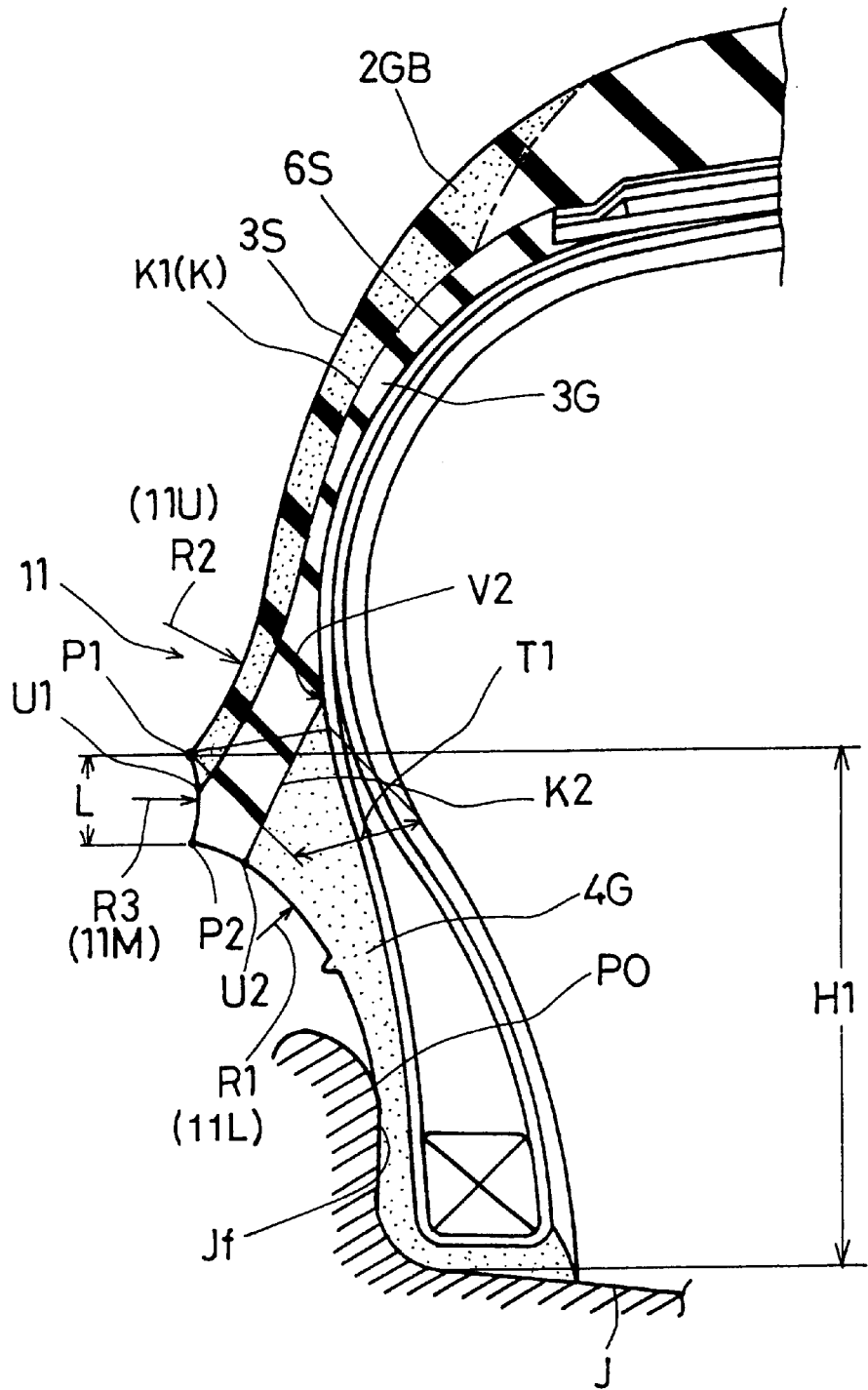
FIG. 5 is an enlarged cross sectional view thereof showing still another example of the rib.

FIGS. 1, 2 and 3 show examples in which the sidewall rubber 3G is not exposed, and FIGS. 4, 5 and 6 show examples in which the sidewall rubber 3G is exposed.

In FIGS. 1 and 2, the sidewall rubber 3G extends from the belt edge near to but slightly radially outward of the top (11M) of the rib 11. The radially outer end of the sidewall rubber 3G is secured between the belt 7 and carcass 6.

The wing rubber 2GB extends from a position axially outside the belt edge to the substantially same position as the radially inner end of the sidewall rubber 3G, and the radially inner end 15e thereof reaches to the clinch rubber 4G. Accordingly, the sidewall rubber 3G is completely covered with the wing rubber 2GB.

As shown in FIG. 2, preferably the radially inner end U1 of the wing rubber 2GB is located at an axial distance N of not less than 2 mm from the edge P1 of the rib top. If the distance N is less than 2 mm, separation and damage are liable to occur at the end U1 when the tire sidewall comes into collision with curbs and the like.

In this embodiment, the radial height Ht measured from the bead base line BL to the top of the rib 11 is not more than 40%, preferably, from 20 to 30% of the tire section height H.

The rib top surface 11M shown in FIGs. 1 and 2 is flat, but it may be possible to form another shape.

In FIG. 3, the rib top surface 11M has a concave part or a circumferentially continuous groove 20, and the radially inner end U1 of the wing rubber 2GB is positioned in the center of the groove bottom so as to provide the above-mentioned axial distance N of not less than 2 mm. The radially inner end of the sidewall rubber 3G is positioned at the substantially same position as the end U1 of the wing rubber 2GB. Comparison Tests Test tires of size 225/35ZR17 were prepared and tested for the durability and steering stability as follows. The specifications thereof and test results are shown in Table 1.
Durability Test Using a tire test drum, a runable distance until any damage was measured under the following conditions. In Table 1, the marked distance is indicated as a percentage of Max. running distance of 60 km.

Wheel rim size: 17X8J

Inner pressure: 300 KPa

Vertical tire load: 875 kgf

Speed: 60 km/h

Steering stability Test

A test driver run a test car on a dry asphalt road in a tire test course and, by the driver's feelings, a handle response, rigidity, grip and the like were evaluated into ten ranks, wherein the higher the value the better the stability.

TABLE 1

| Tire | Ex. 11 | Ex. 12 | Ref. 11 | Ref. 12 | Ref. 13 | Ref. 14 | Ref. 15 |
| --- | --- | --- | --- | --- | --- | --- | --- |
| Structure | FIG. 1 | FIG. 1 | FIG. 11 | FIG. 11 | FIG. 11 | FIG. 11 | FIG. 11 |
| Section height H (mm) | 76 | 76 | 76 | 76 | 76 | 76 | 76 |
| Carcass | | | | | | | |
| Number of ply | 1 | 2 | 1 | 2 | 2 | 2 | 1 |
| Turnup height (mm) | *1 | 45&20 | 45 | 45&20 | 20&10 | *1 | *2 |
| Test Results | | | | | | | |
| Durability | 100 | 100 | 80 | 80 | 90 | 90 | 90 |
| Steering stability | 6 | 6 | 5 | 6 | 4 | 6 | 5 |

*1: The turnup portions were disposed between the belt and carcass, and the overlap with the belt was 15 mm.
*2 The turnup portions were disposed between the belt and carcass, and the overlap with the belt was 10 mm.

In FIG. 4, 5 and 6, the sidewall rubber 3G is exposed as mentioned-above.

The sidewall rubber 3G extends from the belt edge to the top of the rib 11.

The wing rubber 2GB also extends to the top of the rib 11.

On the tire outer surface, the boundary K1 between the wing rubber 2GB and sidewall rubber 3G is positioned in the center of the rib top (11M) which is formed in a concave shape by the same reason as the former example. In this case, however, it is not always necessary to adjust the axial distance N to a relatively large distance because of good adhesion therebetween and the flexible sidewall rubber. In this example, the top surface 11M of the rib 11 is defined as an concave arc having a radius of curvature R3 of from 5 to 30 mm.

Further, as shown in FIG. 5, the boundary line K2 between the sidewall rubber 3G and clinch rubber 4G, intersects the tire outer surface at a point U2 on the radially inner surface 11L of the rib 11, and also intersect the outside of the carcass 6 at a point V2 positioned radially inside of the region Y.

The radial height H1 measured from the bead base line BL to the outer edge P1 is not more than 45% of the tire section height H.

The total rubber thickness T1 measured at the radially outer edge P1 along the axial direction between the tire outer surface and the carcass ply turnup portions 6b is in the range of from 3 to 12 mm, preferably 4 to 8 mm.

If the height H1 is more than 45% of the height H, or the rubber thickness T1 is more than 12 mm, the rigidity of the sidewall portions 3 excessively increases and the steering stability, handle response and the like deteriorate. If the rubber thickness T1 is less than 3 mm, deformation increase on the radially outer surface of the rib 11 and the steering stability and bead durability decrease.

FIG. 4 shows a modification of the carcass 6, wherein the carcass ply turnup portions 6b terminates radially inside the radially outer end 8e of the bead apex rubber 8. In a tire meridian section, the boundary line K3 between the sidewall rubber 3G and bead apex rubber 8, intersects the outside 6S of the carcass 6 at a point V3 which is located radially inside the region Y.

Comparison Test

Test tires of size 275/35ZR18 were prepared and tested for the durability under the following conditions. The specifications of the tires and test results are shown in Table 2.

Wheel rim size: 10.5JX18
Inner pressure: 230 KPa
Vertical load: 510 kgf
Running speed: 60 km/h Next, according to FIGS. 7 to 9, a method of manufacturing the tire according to the invention will be described.

The tire is built up, using a tire building drum 20 which is expandable from a cylindrical contracted state to a toroidal shape.

Figure 7:
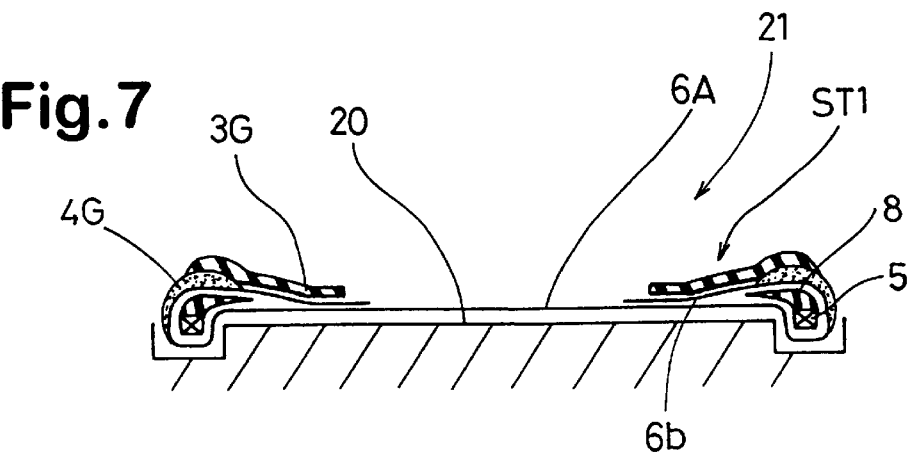
FIGS. 7 to 9 are diagrams for explaining a method of manufacturing tires according to the present invention.

As shown in FIG. 7, the carcass ply 6A is wound around the cylindrical tire building drum 20 on which an inner liner rubber (not shown) is applied beforehand, and the bead cores 5 and bead apex rubber 8 are set. Then, Both ends of the carcass ply 6A are folded upon its central portion to form the carcass ply turnup portions 6b.

Further, the clinch rubber 4G and sidewall rubber 3G are wound, wherein a strip S of integrated clinch rubber and sidewall rubber shown in FIG. 11 is preferably used to improve the dimensional accuracy and the efficiency of work. The integration of the rubber is made by means of a extruder.

The above steps are made under the cylindrical contracted state of the drum 20.

Figure 8:
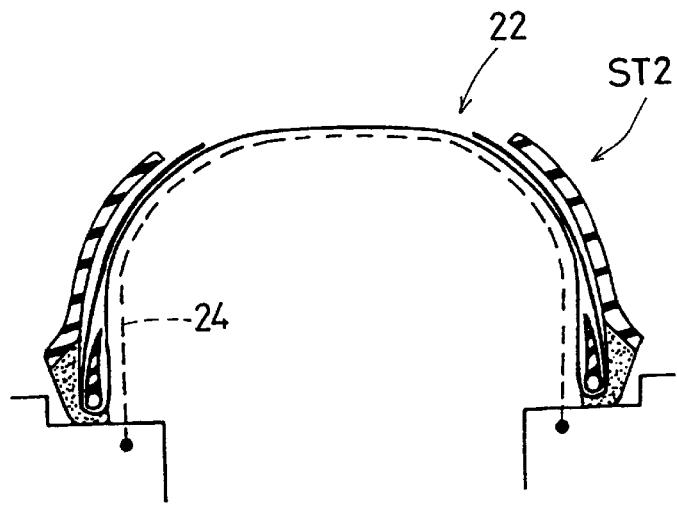

Next, the drum 20 is expanded by inflating a bladder 24 for example, while decreasing the distance between the bead portions as shown in FIG. 8. Thus, the above-mentioned cylindrical assembly 21 transforms into a toroidal body 22.

Figure 9:
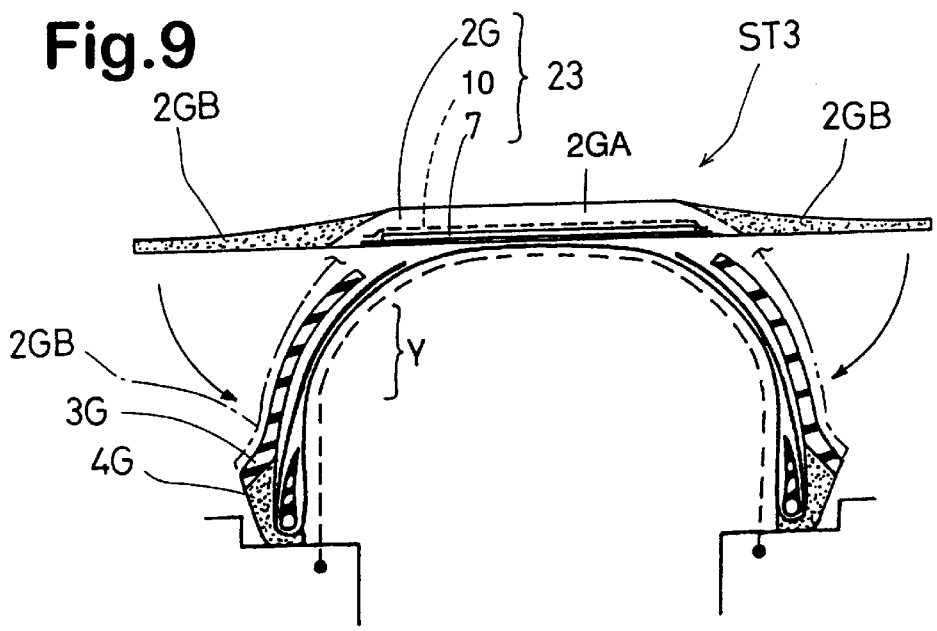
Figure 12:
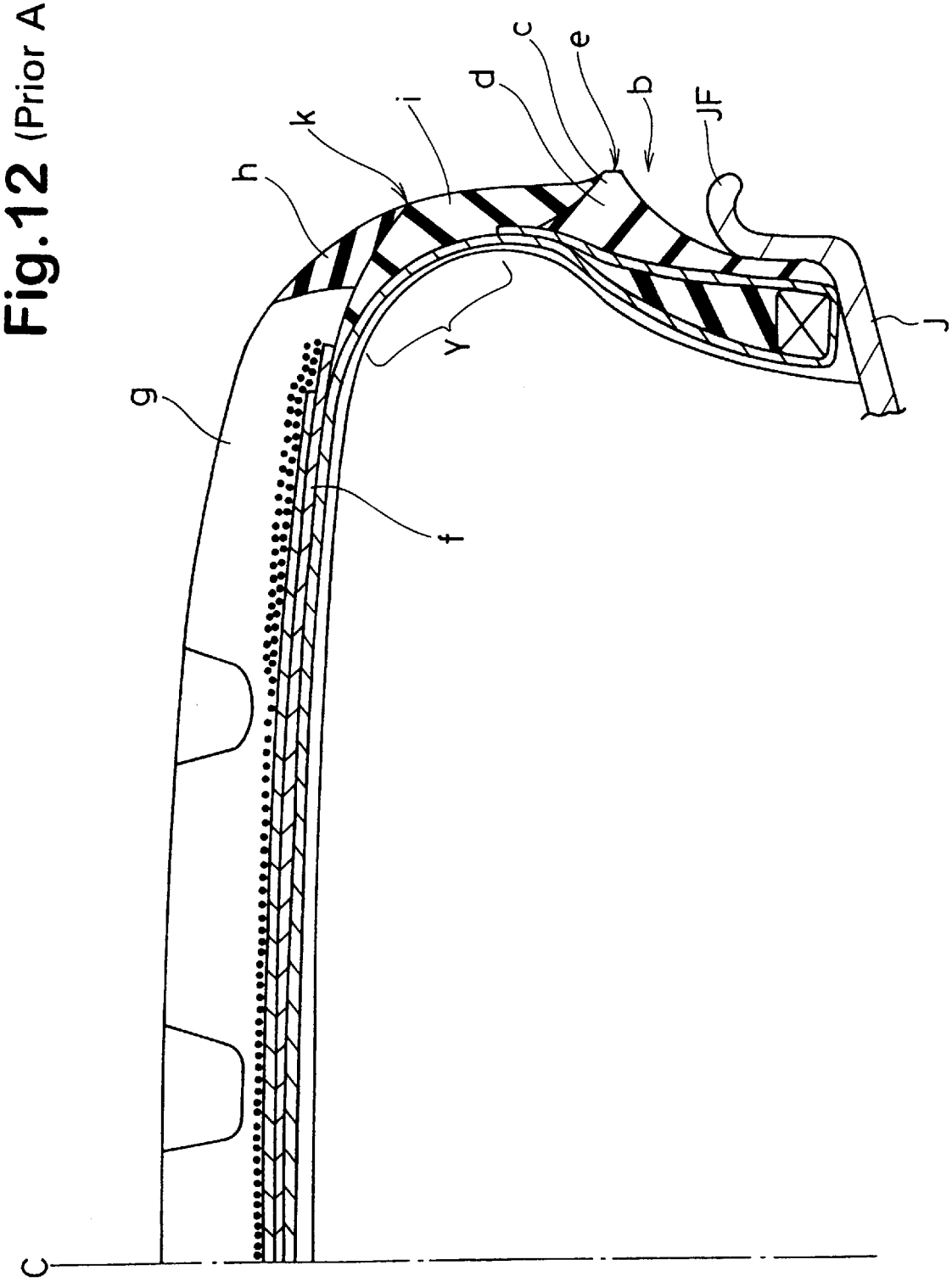
FIG. 12 is a schematic cross sectional view of a prior art tire.

In this state, a tread ring 23 is put around the toroidal body 22 as shown in FIG. 9. The tread ring 23 is an annular assembly of the tread rubber 2GA, wing rubber 2GB, belt 7 and band 9. To make the tread ring 23, first the tread rubber 2GA and wing rubber 2GB are united into a strip T by means of an extruder, and then applied on another drum around which the belt 7 and band 10 are wound in advance.

The wing rubber 2GB is applied to the toroidal body 22. Thus the raw tire is made. Finally, the raw tire is put in a mold and vulcanized.

What is claimed is:

1. A pneumatic tire having an aspect ratio of not more than 55% and comprising an axially protruding rib providing on each side of the tire to overhang a flange of a wheel rim, the rib having a top surface between a radially outer edge P1 and a radially inner edge P2, a radially outer concave surface extending radially outwards from the radially outer edge P1, and a radially inner concave surface extending radially inwards from the radially inner edge P2, a radial height Ht measured from a bead base line B1 to the top of the rib being not more than 40% of the tire section height H, a carcass extending between bead portions through a tread portion and sidewall portions,

TABLE 2

| Tire | Ex. 21 | Ex. 22 | Ex. 23 | Ex. 24 | Ex. 25 | Ex. 26 | Ex. 27 | Ex. 28 | Ex. 29 | Ref. 21 | Ref. 22 | Ref. 23 |
|---|---|---|---|---|---|---|---|---|---|---|---|---|
| Structure | FIG. 4 | FIG. 4 | FIG. 4 | FIG. 4 | FIG. 4 | FIG. 4 | FIG. 4 | FIG. 4 | FIG. 4 | FIG. 4 | Fig.4 | SOT* |
| Section height H (mm) | 94.5 | 94.5 | 94.5 | 94.5 | 94.5 | 94.5 | 94.5 | 94.5 | 94.5 | 94.5 | 94.5 | 94.5 |
| Rib 11 | | | non | | | | | | | | | non |
| Length L (mm) | 7 | 7 | — | 7 | 7 | 4 | 10 | 10 | 10 | 10 | 10 | — |
| P1 height (mm) | 37 | 37 | — | 37 | 37 | 37 | 37 | 37 | 37 | 37 | 37 | — |
| U1 height (mm) | 32.5 | 40 | 32.5 | 32.5 | 32.5 | 32.5 | 32.5 | 32.5 | 32.5 | 55 | 65 | — |
| Radius R1 (mm) | 20 | 20 | — | 20 | 20 | 20 | 20 | 20 | 20 | 20 | 20 | — |
| Radius R2 (mm) | 45 | 45 | — | 45 | 45 | 45 | 45 | 45 | 45 | 45 | 45 | — |
| Radius R3 (mm) | 15 | 15 | — | 15 | 15 | 15 | 15 | 10 | 30 | 30 | 30 | — |
| Thickness T1 (mm) | 9 | 9 | — | 3 | 12 | 9 | 9 | 9 | 9 | 9 | 9 | — |
| Durability | 123 | 102 | 107 | 112 | 125 | 118 | 123 | 123 | 121 | 83 | 95 | 100 |

*) SOT: Sidewall rubber disposed over tread rubber in tire shoulder a belt disposed radially outside the carcass, a tread rubber disposed radially outside the carcass, a sidewall rubber disposed on each side of the tire and extending from the tread portion to the rib along the axially outside of the carcass, a clinch rubber disposed on each side of the tire and extending from the bead portion to the rib along the outer surface of the tire, a wing rubber disposed axially outside the sidewall rubber and extending from the tread rubber to the rib along the outer surface of the tire, the wing rubber being softer than the tread rubber, in a tire meridian section, in a region defined between 45% and 70% of the tire section height, every boundary line between rubber layers which include said tread rubber, sidewall rubber, clinch rubber and wing rubber at least, intersects neither the outer surface of the tire nor the outside of the carcass.

2. The pneumatic tire according to claim 2, wherein
on the outer surface of the tire,
every boundary between said rubber layers is positioned at a distance from the axially extreme end of the rib.

3. The pneumatic tire according to claim 1, wherein said tire section height is not more than 100 mm.

4. The pneumatic tire according to claim 1, wherein
the wing rubber is a rubber compound which includes Ethylene-Propylen-Dien-Monomer and of which acetone extraction is not more than 10%, and
the sidewall rubber is a rubber compound of which acetone extraction is more than 10% but not more than 20%.

5. The pneumatic tire according to claim 1, wherein
the carcass is composed of a single ply extending between the bead portions and turned up around a bead core in each bead portion from the inside to outside of the tire to form a pair of turnup portions and a main portion therebetween, and the radially outer ends of the turnup portions are secured between the carcass and the belt.

6. The pneumatic tire according to claim 1, wherein
the radially outer end of the sidewall rubber is secured between the carcass and the belt.

7. The pneumatic tire according to claim 1, wherein
the sidewall rubber is not exposed to the outside of the tire.

8. The pneumatic tire according to claim 1, wherein
the wing rubber has a radially inner edge positioned in a concave part which is provided on a top of the rib.

9. The pneumatic tire according to claim 1, wherein
the inner surface is defined by a concave arc having a radius $R1$, and the outer surface is defined by a concave arc having a radius $R2$ which is more than the radius $R1$.

10. The pneumatic tire according to claim 1, wherein
the top surface is substantially flat, and
the radially inner end of the wing rubber is located on the radially outer surface at an axial distance N of not less than 2 mm from the radially outer edge $P1$.

11. The pneumatic tire according to claim 1, wherein
the top surface is provided with a groove, and
the radially inner end of the wing rubber is positioned in the bottom of the groove.

* * * * *